United States Patent
Mizusawa (10) Patent No.: US 10,633,043 B2
(45) Date of Patent: Apr. 28, 2020

(54) ELASTIC CRAWLER AND ELASTIC CRAWLER DRIVE MECHANISM

(71) Applicant: BRIDGESTONE CORPORATION, Tokyo (JP)

(72) Inventor: Takashi Mizusawa, Yokohama (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 90 days.

(21) Appl. No.: 15/564,024

(22) PCT Filed: Apr. 12, 2016

(86) PCT No.: PCT/JP2016/001989
§ 371 (c)(1),
(2) Date: Oct. 3, 2017

(87) PCT Pub. No.: WO2016/166969
PCT Pub. Date: Oct. 20, 2016

(65) Prior Publication Data
US 2018/0134333 A1     May 17, 2018

(30) Foreign Application Priority Data

Apr. 16, 2015   (JP) ................................ 2015-083999

(51) Int. Cl.
| | |
|---|---|
| *B62D 55/24* | (2006.01) |
| *B62D 55/253* | (2006.01) |
| *B62D 55/125* | (2006.01) |

(52) U.S. Cl.
CPC ......... *B62D 55/242* (2013.01); *B62D 55/125* (2013.01); *B62D 55/253* (2013.01)

(58) Field of Classification Search
CPC .... B62D 55/24; B62D 55/244; B62D 55/202; B62D 55/12
See application file for complete search history.

(56) References Cited

U.S. PATENT DOCUMENTS

| | | | | |
|---|---|---|---|---|
| 6,139,121 A | * | 10/2000 | Muramatsu | ............ B62D 55/24 305/173 |
| 7,156,474 B2 | * | 1/2007 | Safe | ...................... B62D 55/24 305/115 |

(Continued)

FOREIGN PATENT DOCUMENTS

| | | |
|---|---|---|
| CN | 100579853 C | 1/2010 |
| CN | 102300763 A | 12/2011 |

(Continued)

OTHER PUBLICATIONS

Communication dated Nov. 5, 2018, from the State Intellectual Property Office of People's Republic of China in counterpart Application No. 201680021473.7.

(Continued)

*Primary Examiner* — Jason R Bellinger
(74) *Attorney, Agent, or Firm* — Sughrue Mion, PLLC (57) ABSTRACT

An elastic crawler and an elastic crawler drive mechanism collectively suppress the interference between the pin members and the engaging portions, and improve the durability of the engaging portions. The elastic crawler includes on an inner circumferential side thereof a plurality of engaging portions (14) respectively engageable with a plurality of pin members (22) arranged at a spacing in a circumferential direction of a sprocket, wherein: the engaging portions (14) have a pressure receiving surface (14*a*) which receives the pin members (22), an outline shape in side view of the pressure receiving surface (14*a*) being formed by an envelope L1 drawn by an outer end of the pin members (22) when the sprocket rolls coaxially with a central axis of a virtual rotor with a rolling diameter D1 defined by D1=(pitch of the engaging portions)×(number of pin members)/(π)×a, and 0.9≤a≤1, together with the virtual rotor on a plane.

20 Claims, 8 Drawing Sheets

(56) References Cited

U.S. PATENT DOCUMENTS

| | | |
|---|---|---|
| 2008/0211300 A1 | 9/2008 | Matsuo et al. |
| 2010/0156170 A1 | 6/2010 | Zheng et al. |
| 2015/0321712 A1 | 11/2015 | Okada |

FOREIGN PATENT DOCUMENTS

| | | |
|---|---|---|
| CN | 104411572 A | 3/2015 |
| JP | 09-066869 A | 3/1997 |
| JP | 09-193852 A | 7/1997 |
| JP | 2006-069293 A | 3/2006 |
| JP | 2007-276735 A | 10/2007 |
| JP | 2014-015156 A | 1/2014 |

OTHER PUBLICATIONS

International Search Report for PCT/JP2016/001989, dated Jun. 28, 2016.

* cited by examiner

ELASTIC CRAWLER AND ELASTIC CRAWLER DRIVE MECHANISM

CROSS REFERENCE TO RELATED APPLICATIONS

This application is a National Stage of International Application No. PCT/JP2016/001989 filed Apr. 12, 2016, claiming priority based on Japanese Patent Application No. 2015-083999 filed Apr. 16, 2015, the contents of all of which are incorporated herein by reference in their entirety.

TECHNICAL FIELD

This disclosure relates to an elastic crawler and an elastic crawler drive mechanism.

BACKGROUND

Conventionally known is an elastic crawler having on an inner circumferential side a plurality of engaging portions (driving protrusions) respectively engageable with a plurality of pin members (meshing portions) arranged at a spacing in a circumferential direction of a sprocket (see, e.g., PTL1). The elastic crawler drive mechanism as disclosed in PTL1 has a large spacing (gap) in the circumferential direction between the pin members arranged on the sprocket, and thus is free from the risk of tooth jump due to mud jamming, etc. Moreover, since the pin members are rolling, engaging failure between the pin members and the elastic protrusions is permitted, and by forming an isosceles portion expanding an angle in the radial direction of the pin members and thereby rendering the pin members of the sprocket and the engaging portions of the elastic crawler be in surface contact, durability of the engaging portions is improved.

CITATION LIST

Patent Literature

PTL1: JP2006069293A

SUMMARY

Technical Problem

However, in the aforementioned elastic crawler, since the engaging portions of the elastic crawler have an isosceles triangular shape in a side view, and its inclined surface is no more than in surface contact with the isosceles portion formed on the pin members, interference between the pin members and the engaging portions is large when the pin members are engaged with the engaging portions, and thus there is still room for improvement of durability of the engaging portions.

This disclosure aims to provide an elastic crawler and an elastic crawler drive mechanism which suppress the interference between the pin members and the engaging portions, and simultaneously improve the durability of the engaging portions.

Solution to Problem

The elastic crawler according to this disclosure is an elastic crawler comprising on an inner circumferential side a plurality of engaging portions respectively engageable with a plurality of pin members arranged at a spacing in a circumferential direction of a sprocket, wherein: the engaging portions have on a base side of the engaging portions a pressure receiving surface which receives the pin members, an outline shape in side view of the pressure receiving surface being formed by an envelope drawn by an outer end of the pin members when the sprocket rolls coaxially with a central axis of a virtual rotor with a rolling diameter $D_1$ as defined in the following Formula (1), together with the virtual rotor on a plane:

$$D_1 = D_0 \times a \quad (1)$$

where, $D_0$=(pitch PT of the engaging portions)×(number of pin members)/($\pi$), and $$0.9 \le a < 1$$

According to the elastic crawler according to this disclosure, it is possible to suppress the interference between the pin members and the engaging portions, and simultaneously improve the durability of the engaging portions.

In particular, in the elastic crawler according to this disclosure, it is preferable that a condition that $0.94 \le a \le 0.98$ is satisfied in Formula (1).

In this case, it is possible to suppress the interference between the pin members and the engaging portions more securely.

In the elastic crawler according to this disclosure, it is preferable that the engaging portions have on a tip side of the engaging portions a flank for avoiding interference with the pin members, an outline shape in side view of the flank being formed by an envelope drawn by an outer end of the pin members when the sprocket rolls coaxially with a central axis of a virtual rotor with a rolling diameter $D_2$ as defined in the following Formula (2), together with the virtual rotor on a plane:

$$D_2 = D_0 \times b \quad (2)$$

where $1 \le b \le 1.1$

In this case, it is possible to suppress the interference between the pin members and the engaging portions, and simultaneously further improve the durability of the engaging portions.

In particular, in the elastic crawler according to this disclosure, it is preferable that a condition that $1.00 \le b \le 1.03$ is satisfied in Formula (2).

In this case, it is possible to suppress the interference between the pin members and the engaging portions when breaking or running downhill, and simultaneously ensure a large volume of the engaging portions.

In the elastic crawler according to this disclosure, it is preferable that an outline shape in side view of a connecting part between the pressure receiving surface and the flank is formed by a curve.

In this case, the pressure receiving surface and the flank are smoothly connected via the connecting part, and thus it is possible to smoothly perform engaging action and releasing action between the pin members and the engaging portions.

In the elastic crawler according to this disclosure, it is preferable that a height of the connecting part between the pressure receiving surface and the flank from an inner circumferential surface of an endless belt is 25% or more and 60% or less of an entire height of the engaging portions.

In this case, it is possible to suppress the interference between the pin members and the engaging portions more securely, and simultaneously improve the durability of the engaging portions.

The elastic crawler drive mechanism according to this disclosure comprises: the elastic crawlers according to any one of the aspects above, and a sprocket having a plurality of pin members arranged at a spacing in a circumferential direction. According to the elastic crawler drive mechanism according to this disclosure, it is possible to suppress the interference between the pin members and the engaging portions, and simultaneously improve the durability of the engaging portions.

Advantageous Effect

According to this disclosure, it is possible to provide an elastic crawler and an elastic crawler drive mechanism which suppress the interference between the pin members and the engaging portions, and simultaneously improve the durability of the engaging portions.

DETAILED DESCRIPTION

In the following, the elastic crawler and the elastic crawler drive mechanism according to one embodiment of this disclosure is described by referring to the drawings. In the following description, the circumferential direction of the elastic crawler is synonymous to the circumferential direction of the endless belt, and the width direction is synonymous to the width direction of the elastic crawler (endless belt). Further, the side surface is synonymous to the side surface of the elastic crawler (endless belt).

Figure 1:
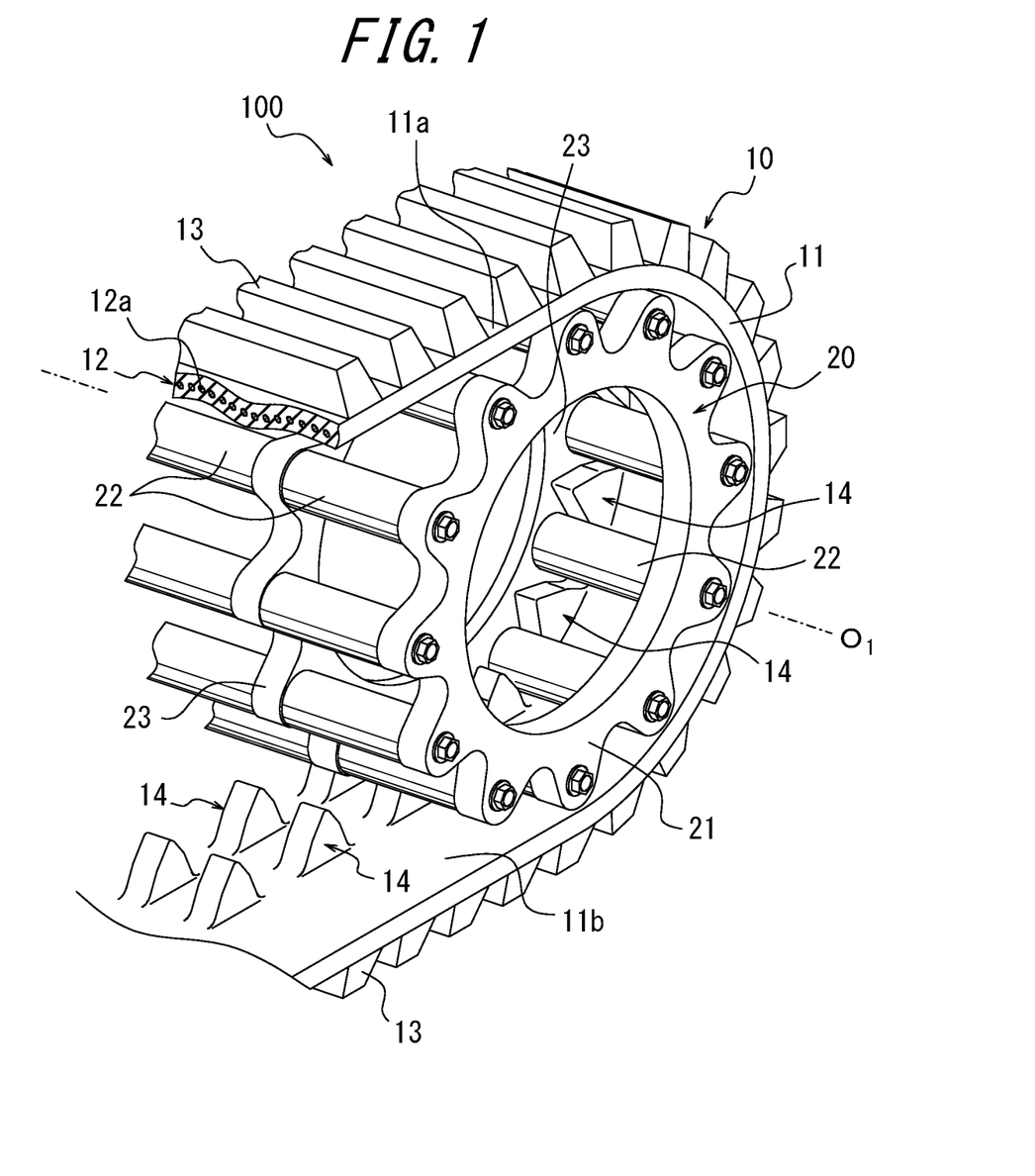
FIG. 1 is an enlarged perspective view schematically illustrating a partial cross section of the elastic crawler and the elastic crawler drive mechanism according to an embodiment of this disclosure.

In FIG. 1, reference sign 100 is the elastic crawler drive mechanism according to an embodiment of this disclosure. Moreover, reference sign 10 is the elastic crawler according to an embodiment of this disclosure. The elastic crawler 10 has an endless belt 11. The endless belt 11 is an annular member without end portions. Inside the endless belt 11, a main cord layer 12 is arranged. The main cord layer 12 is formed by, e.g., arranging a plurality of steel cords 12a circling around the endless belt 11 at a spacing in the width direction. In the present embodiment, the endless belt 11 is obtained via, e.g. vulcanization forming of rubber materials.

The elastic crawler 10 has a plurality of lugs 13 disposed on its outer circumferential side. The lugs 13 are arranged at a spacing in the circumferential direction of the endless belt 11. In the present embodiment, the lugs 13 protrude from an outer circumferential surface 11a of the endless belt 11, and extend in the width direction.

The elastic crawler 10 has a plurality of elastic protrusions (engaging portions) 14 disposed on its inner circumferential side. The elastic protrusions 14 are arranged at a spacing in the circumferential direction of the endless belt 11. In the present embodiment, the elastic protrusions 14 protrude from the inner circumferential surface 11b of the endless belt 11, and are arranged in groups of two at a spacing in the width direction in the vicinity of a widthwise center of the endless belt 11. The lugs 13 and the elastic protrusions 14 may be either formed integrally with the endless belt 11 via vulcanization forming, or singly installed via adhesion, etc.

The reference sign 20 is a sprocket engaged with the elastic protrusions 14 of the elastic crawler 10. In the sprocket 20, between two wheel bodies 21 arranged at a spacing in the widthwise direction, a plurality of pin members 22 are hung over a circumference of a central axis $O_1$ of the sprocket 20 at a spacing in the circumferential direction. In the present embodiment, the sprocket 20 has two wheel bodies 21 (a wheel body 21 on the inner side of the drawing is omitted in FIG. 1) arranged at a spacing in the width direction, one intermediate body 23 arranged between the two wheel bodies 21 at a spacing in the width direction from the wheel bodies 21, and a plurality of pin members 22 hung over between the wheel bodies 21 and the intermediate body 23.

Figure 2:
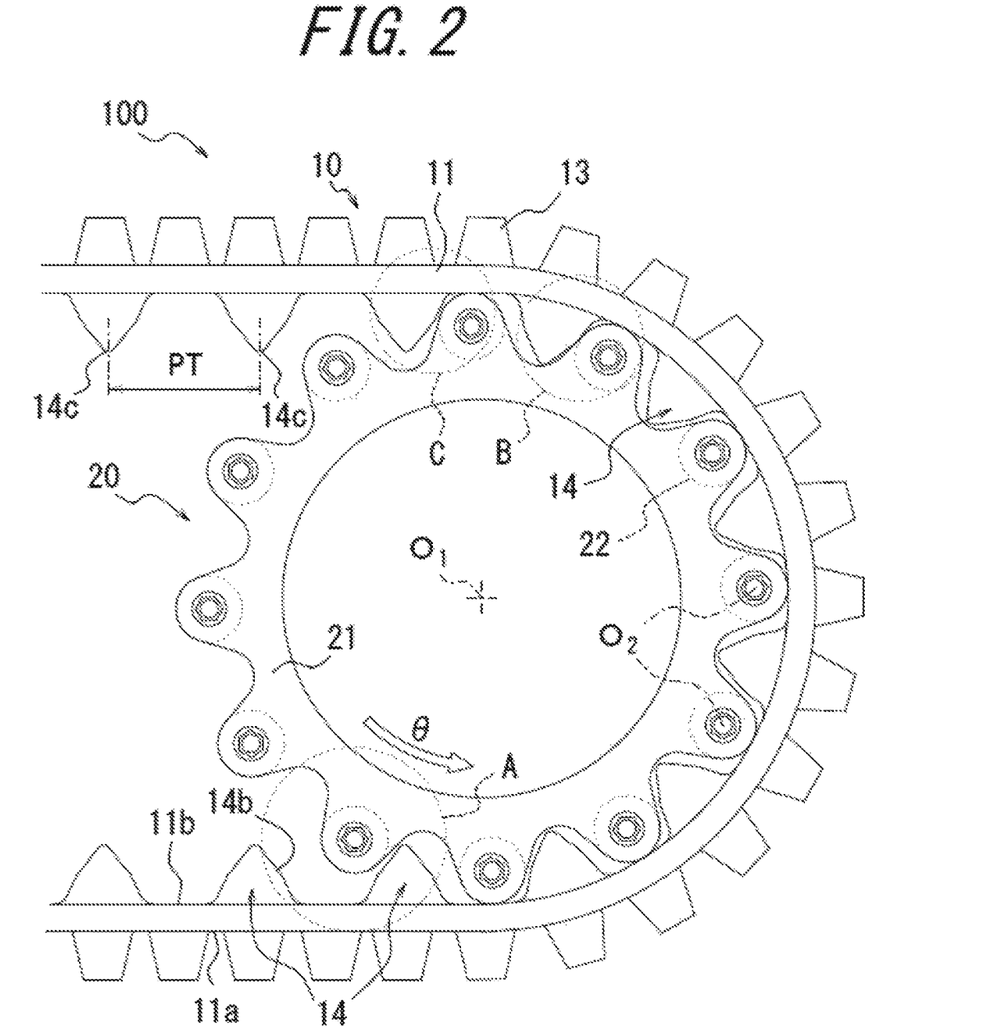
FIG. 2 is an enlarged side view schematically illustrating the elastic crawler drive mechanism of FIG. 1.

In the present embodiment, as illustrated in FIG. 2, the pin members 22 are arranged at a spacing in the circumferential direction on the circumference of the central axis $O_1$ of the sprocket 20. The pin members 22 respectively enter between the elastic protrusions 14 of the elastic crawler 10 in order due to rotation of the sprocket 20, and are then engaged with one elastic protrusion 14, and presses the elastic protrusion 14 in the rotation direction of the sprocket 20. Namely, in the elastic crawler drive mechanism 100, it is possible to drive the elastic crawler 10 by transferring the rotation of the sprocket 20 to the elastic crawler 10.

Here, in the case of an elastic crawler drive mechanism using a so-called cage type sprocket 20 having a plurality of pin members 22, such as the present embodiment, when the pin members 22 and the elastic protrusions 14 rotate at the same speed, a track drawn by a rotation central axis $O_2$ of the pin members 22 is a cycloid curve when rolling the sprocket 20 on a plane as a rotor. At this time, by plotting an envelope drawn by the outer end of the pin members 22, it is possible to draw the track of the outer end of the pin members 22. Therefore, by forming the outline shape in side view of the elastic protrusions into the envelope, a shape fitting with the track of the pin members 22 is formed.

However, when the rotational velocity of the pin members 22 and the elastic protrusions 14 are not in accordance, for example, when the pin members 22 rotate ahead of the elastic protrusions 14, even if the outline shape of the elastic protrusions is formed by the aforementioned envelope, a shape fitting with the track of the pin members 22 cannot be formed.

For example, when rotating the sprocket 20 to drive the elastic crawler 10, the pin members 22 are not engaged with the elastic protrusions 14 at the start of winding onto the elastic crawler 10, but in accordance with the rotation, the pin members 22 approach elastic protrusions 14 on a forward side in the rotation direction, and are then engaged with the elastic protrusions 14 at the end of winding. Namely, when driving the elastic crawler 10 by rotating the sprocket 20, although the pin members 22 rotate comparatively faster than the elastic protrusions 14, by reducing the diameter of the rotor for drawing the cycloid curve, it is possible to approximate the actual track of the pin members 22.

Figure 3A:
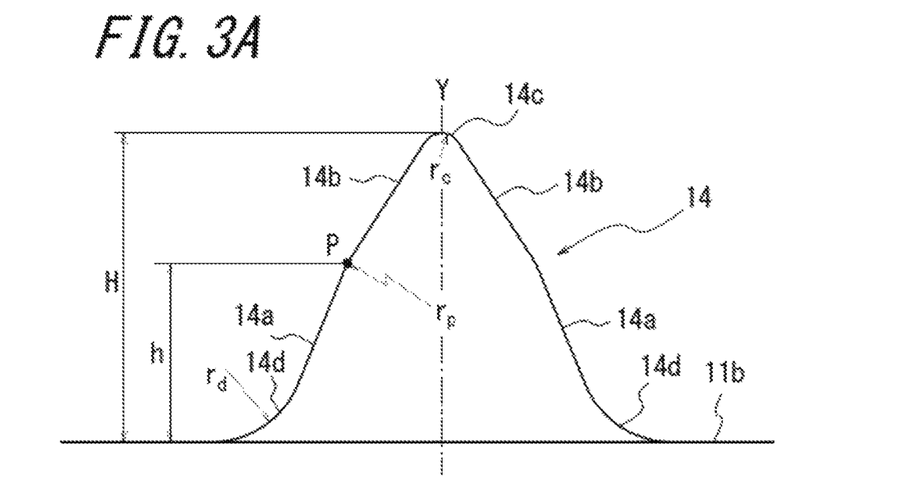
FIG. 3A is an enlarged side view schematically illustrating an elastic protrusion disposed on the elastic crawler of FIG. 1.
Figure 3B:
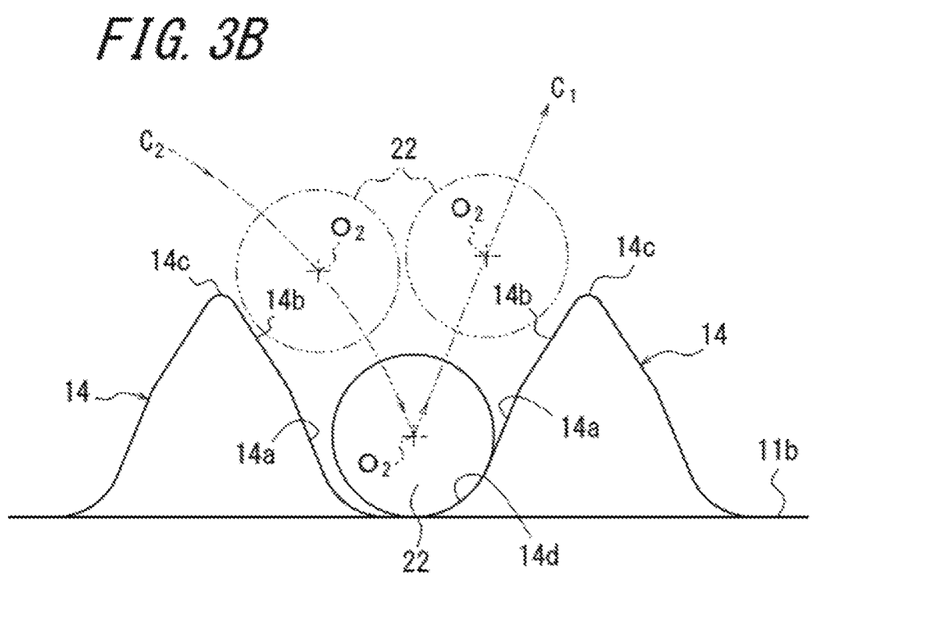
FIG. 3B exemplifies movement of the pin member in the elastic crawler drive mechanism of FIG. 1 when the sprocket rotates in one direction and the pin member is engaged with the elastic protrusion.

FIG. 3A is an enlarged side view schematically illustrating an elastic protrusion 14 of the elastic crawler 10 seen from the side. As illustrated in FIG. 3B, the elastic protrusion 14 has a pressure receiving surface 14a for receiving the pin member 22 on its base side. The outline shape in side view of the pressure receiving surface 14a is formed by the first envelope $L_1$ drawn by an outer end of the pin members 22 when the sprocket 20 (identical to the "wheel bodies 21" in the present embodiment) rolls coaxially with a central axis of a virtual rotor 20a with a rolling diameter $D_1$ as defined in the following Formula (1), together with the virtual rotor 20a on a plane F. The first envelope L1 is not specifically labelled in FIG. 3A because it overlaps with the pressure receiving surface 14a.

Notes $$D_1 = D_0 \times a \qquad (1)$$

Here, $D_0$ = (pitch PT of elastic protrusions 14)×(number of pin members 22)/($\pi$), and $$0.9 \le a < 1.$$

Specifically, $D_0$ is a standard diameter for determining the rolling diameter $D_1$ of the virtual rotor 20a. As illustrated in FIG. 2, the pitch PT of the elastic protrusions 14 is a pitch between apexes 14c of the elastic protrusions 14 when the elastic crawler 10 (the endless belt 11) is stretched horizontally. The pitch PT may be represented in, e.g., mm. Moreover, the number of the pin members 22 is the number of the pin members 22 arranged in the circumferential direction. In the present embodiment, as illustrated in FIG. 2, the number of the pin members 22 is 12. Namely, in the present embodiment, the standard diameter $D_0$ is approximately equal to a diameter of a virtual circle connecting the apexes 14c of the elastic protrusions 14, assuming that the elastic crawler 10 is a annular member wound onto the circumference of the sprocket 20. a is a predetermined number satisfying the condition $0.9 \le a < 1$. Namely, in the present embodiment, the rolling diameter $D_1$ of the virtual rotor 20a has smaller dimensions than the standard diameter $D_0$. In this disclosure, any number within a range of $0.94 \le a \le 0.98$ is preferable.

Figure 4A:
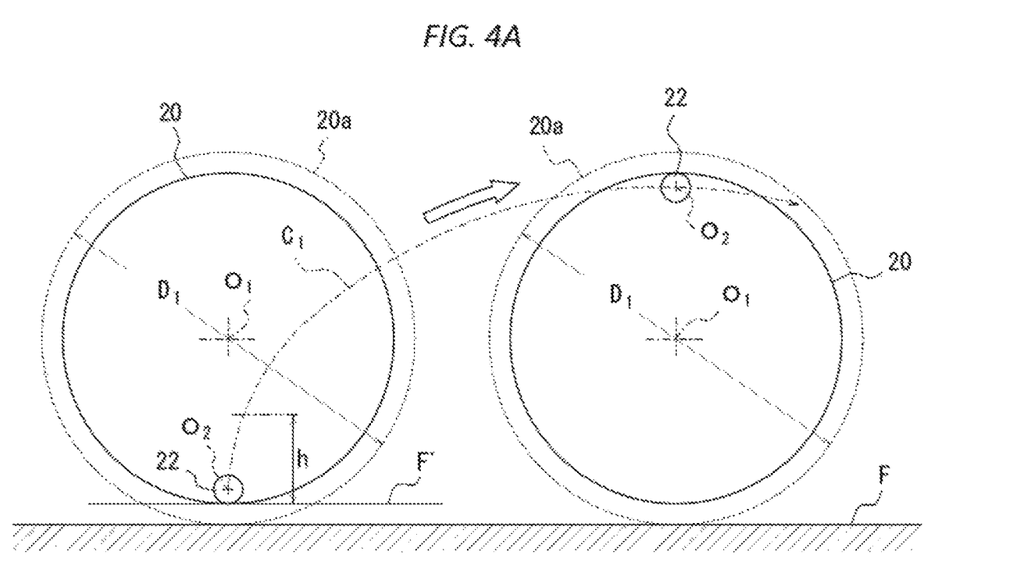
FIG. 4A describes a method for illustrating a cycloid curve used in calculation of a first and a second envelope for defining the outline shape of the elastic protrusion in the elastic crawler and the elastic crawler drive mechanism according to an embodiment of this disclosure.

More specifically, assuming that the central axis $O_1$ of the sprocket 20 and the central axis of the virtual rotor 20a are fixed coaxially, a cycloid curve $C_1$ of the pin member 22 when the sprocket 20 rolls together with the virtual rotor 20a on the plane F is illustrated with the alternate long and short dashes lines in FIG. 4A. In FIG. 4A, the virtual rotor 20a with the rolling diameter $D_1$ calculated from the aforementioned Formula (1) is illustrated with dashed line, and the actual sprocket 20 is illustrated with solid line. The cycloid curve $C_1$ is a track drawn by the rotation central axis $O_2$ of one pin member 22 by arranging the sprocket 20 coaxially with the central axis $O_1$ of the virtual rotor 20a, and rolling this sprocket 20 integrally with the virtual rotor 20a on the plane F. The central axis of the virtual rotor 20a is not specifically labelled in FIG. 4A because it is coaxial with the central axis $O_1$ of the sprocket 20.

Figure 5:
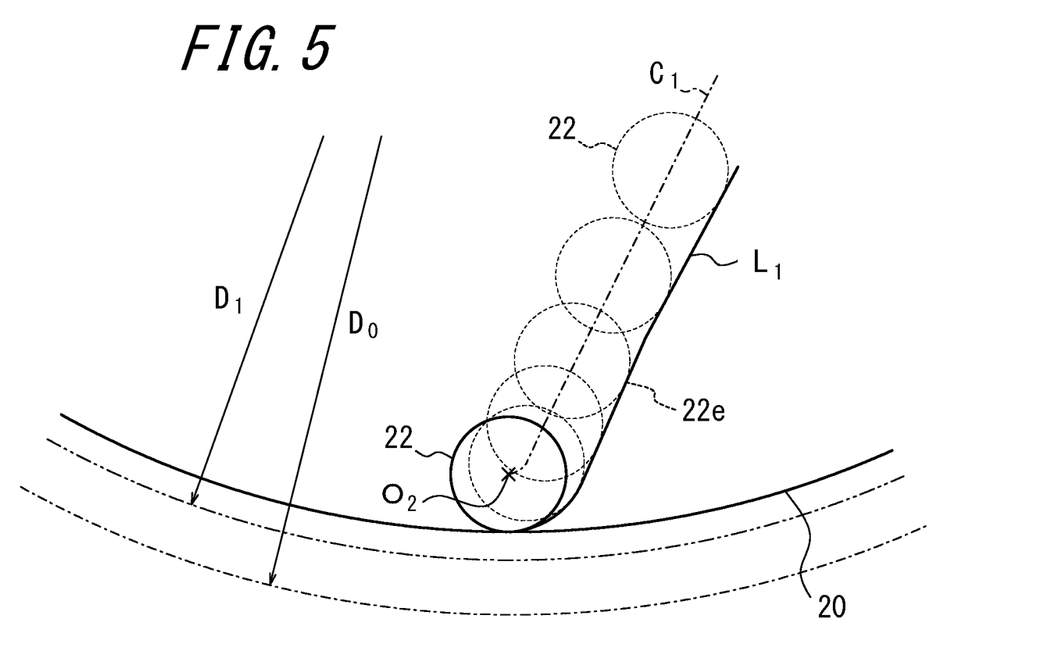
FIG. 5 illustrates analysis for describing the first envelope for forming the outline shape of the pressure receiving surface of the elastic protrusion in FIG. 3A.

In FIG. 3A, the outline shape in side view of the pressure receiving surface 14a of the elastic protrusion 14 is formed by the first envelope $L_1$. The first envelope $L_1$ is a line drawn by the outer end of the pin member 22 when the sprocket 20 rolls together with the virtual rotor 20a on the plane F. The first envelope L1 is not specifically labelled in FIG. 3A because it overlaps with the pressure receiving surface 14a. In detail, as illustrated in FIG. 5, the first envelope $L_1$ is a line obtained by chronologically plotting the pin member 22 moving along the cycloid curve $C_1$, and combining an engaging side outermost end 22e when the pin member 22 is engaged with the elastic protrusion 14.

In the present embodiment, as illustrated in the left side of FIG. 4A, the cycloid curve $C_1$ starts at a position where the pin member 22 is arranged at the lowest point, and as illustrated in the right side of FIG. 4A, is drawn by rolling the sprocket 20 integrally with the virtual rotor 20a. In the present embodiment pressure, the outline shape of the receiving surface 14a is formed by the first envelope $L_1$ drawn by the engaging side outermost end 22e of the pin member 22, according to a cycloid curve $C_1$ of any length with a lowest point as illustrated in the left side of FIG. 4A as a base point, among the cycloid curve $C_1$ extending from the lowest point to the right side of FIG. 4A. The "any length" mentioned here refers to a length which may be appropriately set according to the specs, etc. of the elastic crawler 10. For example, the "any length" is a length parallel to the plane F until a height from a tangent F' of the sprocket 20 becomes a height h.

In this way, if the outline shape of the pressure receiving surface 14a is formed by the first envelope $L_1$ drawn by the outer end of the pin member 22, the shape of the pressure receiving surface 14a of the elastic protrusion 14 becomes close to a desirable shape of the track of the pin member 22 from being engaged with the pin member 22 until being pressed out by the pin member 22. Therefore, unnecessary interference with the elastic protrusion 14 when being engaged with the elastic protrusion 14 at the pressure receiving surface 14a and transferring force to the elastic protrusion 14 is suppressed, and it is possible to suppress unnecessary interference with the elastic protrusion 14 when the pin member 22 is released from the elastic protrusion 14 such that its engagement with the pressure receiving surface 14a of the elastic protrusion 14 is released, and to set the volume of the elastic protrusion 14 as large as possible.

If the elastic protrusion 14 rotates ahead of the pin member 22, a shape fitting with the track of the pin member 22 cannot be obtained, even if the outline shape of the elastic protrusion is formed by the aforementioned envelope.

For example, when being driven, such as during braking such as engine braking and the like, or running downhill, etc., in contrary to the case of driving, the pin member 22 is not engaged with the elastic protrusion 14 when the winding with the elastic crawler 10 is finished, but when the winding with the elastic crawler 10 is started, it approaches an elastic protrusion 14 on a backward side in the rotation direction, and simultaneously enters between the two elastic protrusions 14. Namely, in contrary to the case of driving, when the sprocket 20 is driven by the elastic crawler 10, the elastic protrusion 14 can be said as rotating comparatively faster than the pin member 22, and in this case, the diameter of the rotator for drawing the cycloid curve is enlarged, and thus it is possible to approximate the actual track of the pin member 22.

In the present embodiment, as illustrated in FIG. 3B, the elastic protrusion 14 has a flank 14b for avoiding the interference with the pin member 22 on its tip side. The outline shape in side view of the flank 14b is formed by a second envelope $L_2$ drawn by the outer end of the pin members 22 when the sprocket 20 (identical to the "wheel bodies 21" in the present embodiment) rolls coaxially with the central axis of a virtual rotor 20b with a rolling diameter $D_2$ as defined in the following Formula (2), together with the virtual rotor 20b on the plane F. The second envelope L2 is not specifically labelled in FIG. 3B because it overlaps with the pressure receiving surface 14B.

Notes $$D_2 = D_0 \times b \quad (2)$$

Here, $D_0$=(pitch PT of elastic protrusions 14)×(number of pin members 22)/(π), and $$1 \le b \le 1.1$$

Specifically, $D_0$ is a standard diameter obtained with the same method as the aforementioned Formula (1). Moreover, b is a predetermined value satisfying the condition 1≤b. Namely, in the present embodiment, the rolling diameter $D_2$ of the virtual rotor 20b has larger dimensions than the standard diameter $D_0$. In this disclosure, any number within a range of 1.00≤b≤1.03 is preferable.

Figure 4B:
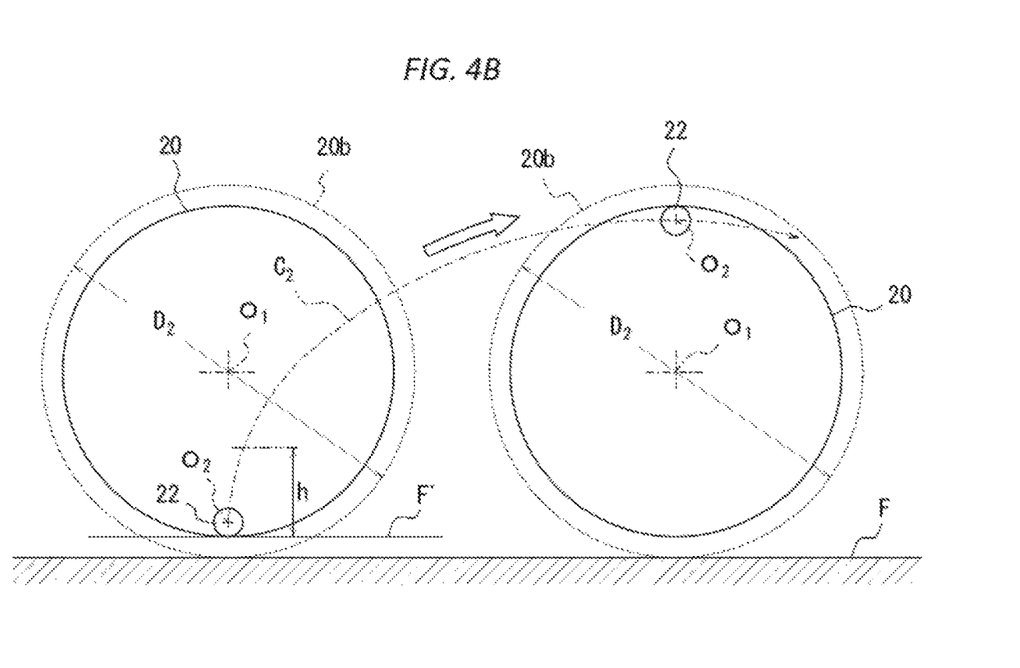
FIG. 4B describes a method for illustrating a cycloid curve used in calculation of a first and a second envelope for defining the outline shape of the elastic protrusion in the elastic crawler and the elastic crawler drive mechanism according to an embodiment of this disclosure.

More specifically, assuming that the central axis $O_1$ of the sprocket 20 and the central axis of the virtual rotor 20b are fixed coaxially similarly as the pressure receiving surface 14a, a cycloid curve $C_2$ of the pin member 22 when the sprocket 20 rotates together with the virtual rotor 20b on the plane F is illustrated with the alternate long and short dashes lines in FIG. 4B. In FIG. 4B, the virtual rotor 20b with the rolling diameter $D_2$ calculated from the aforementioned Formula (2) is illustrated with dashed line, and the actual sprocket 20 is illustrated with solid line. The cycloid curve $C_2$ is a track drawn by the rotation central axis $O_2$ of one pin member 22 by arranging the sprocket 20 coaxially with the central axis of the virtual rotor 20b, and rolling this sprocket 20 integrally with the virtual rotor 20b on the plane F. Although FIG. 4B is not drawn to scale, the virtual rotor 20b is actually slightly larger than the virtual rotor 20a, as can be seen by comparing Formula (1) and Formula (2). The central axis of the virtual rotor 20b is not specifically labelled in FIG. 4B because it is coaxial with the central axis $O_1$ of the sprocket 20.

Figure 6:
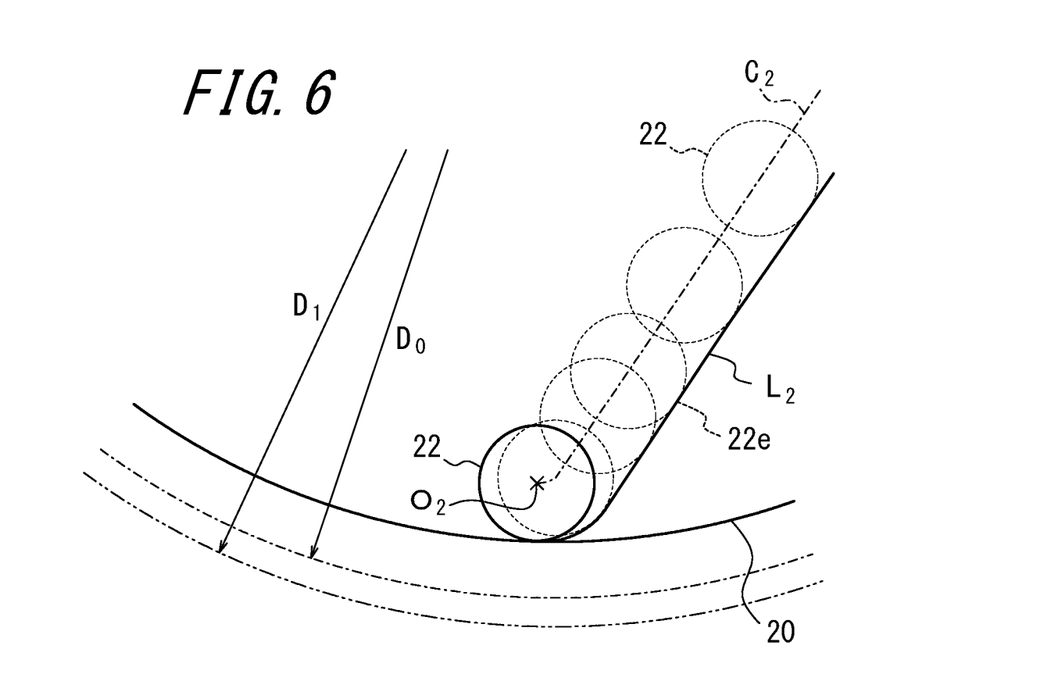
FIG. 6 illustrates analysis for describing the second envelope for forming the outline shape of the flank of the elastic protrusion in FIG. 3A.

In FIG. 3A, the outline shape in side view of the flank 14b of the elastic protrusions 14 is formed by the second envelope $L_2$. The second envelope $L_2$ is a line drawn by the outer end of the pin member 22 when the sprocket 20 rolls together with the virtual rotor 20b on the plane F. In detail, as illustrated in FIG. 6, the second envelope $L_2$ is a line obtained by chronologically plotting the pin member 22 moving along the cycloid curve $C_2$, and combining the engaging side outermost end 22e when the pin member 22 is engaged with the elastic protrusions 14.

In the present embodiment, as illustrated in the left side of FIG. 4B, the cycloid curve $C_2$ starts at a position where the pin member 22 is arranged at the lowest point, and as illustrated in the right side of FIG. 4B, is drawn by rolling the sprocket 20 integrally with the virtual rotor 20b. In the present embodiment, the outline shape of the flank 14b is formed by the envelope $L_2$ drawn by the outer end of the pin member 22, according to a cycloid curve $C_2$ of any length among the cycloid curve $C_2$ extending from the lowest point as illustrated in the left side of FIG. 4B to the right side of FIG. 4B. The "any length" mentioned here refers to a length which may be appropriately set according to the specs, etc. of the elastic crawler. For example, the "any length" is a length parallel to the plane F with a value of the cycloid curve $C_2$, until a height from a tangent F' of the sprocket 20 becomes a height h.

In this way, if the outline shape of the flank 14b is formed by the second envelope $L_2$ drawn by the outer end of the pin member 22, the shape of the flank 14b of the elastic protrusion 14 becomes close to a desirable shape of the track of the pin member 22 until the start of entering between the two elastic protrusions 14. Therefore, during engagement of the pin member 22 and the elastic protrusion 14, hanging of the pin member 22 to the tip part of the elastic protrusions 14 is avoided when it is about to enter between the two elastic protrusions 14, and when the pin member 22 is released from the elastic protrusion 14 such that its engagement with the elastic protrusion 14 is released, it is possible to avoid hanging to the tip part of the elastic protrusions 14, and to set the volume of the elastic protrusion 14 as large as possible.

In the present embodiment, as illustrated in FIG. 3A, the height h corresponds to a height of a connecting part P between the pressure receiving surface 14a and the flank 14b. The height h is preferably 25% or more and 60% or less of an entire height H of the elastic protrusion 14. In this case, it is possible to achieve the effect of the pressure receiving surface 14a and the flank 14b in a more desirable shape, and to set the volume of the elastic protrusion 14 as large as possible.

The outline shape in side view of the connecting part P of the pressure receiving surface 14a and the flank 14b is preferably formed by a curve. In the present embodiment, as illustrated in FIG. 3A, the connecting part P has a large radius of curvature $r_p$, and thereby smoothly connects the pressure receiving surface 14a and the flank 14b. In this case, it is possible to smoothly perform an engaging action since the pin member 22 of the sprocket 20 starts to enter between the elastic protrusions 14 of the elastic crawler 10 until the engagement is finished, and a releasing action since the pin member 22 of the sprocket 20 starts to release the engagement with the elastic protrusion 14 of the elastic crawler 10.

In the present embodiment, two flanks 14b of the elastic protrusion 14 are connected via a top surface 14c extending in the width direction of the elastic crawler 10. In the present embodiment, the top surface 14c is curved in a manner protruding to the outer side of the elastic protrusion 14. Moreover, in the present embodiment, as illustrated in FIG. 3A, on a base portion of the elastic protrusion 14, a recessed surface 14d is formed between the inner circumferential surface 11b of the endless belt 11 and the pressure receiving surface 14. The outline shape in side view of the recessed surface 14d is formed by a curve configured with a radius of curvature $r_d$. The radius of curvature $r_d$ is preferably the diameter of the pin member 22. In this case, the contact area of the elastic protrusion 14 and the pin member 22 is increased, and thus it is possible to relax the stress during engagement. Further, in the present embodiment, as illustrated in FIG. 3A, the outline shape in side view of the elastic protrusion 14 is a shape symmetrical sandwiching a line Y orthogonal to the inner circumferential surface 11b of the endless belt 11.

Here, by referring to FIGS. 2 and 3B, the effect of the elastic crawler drive mechanism 100 using the elastic crawler 10 according to the present embodiment is described.

When driving the elastic crawler 10 by using a so-called cage type sprocket 20 having a plurality of pin members 22 similarly as the present embodiment, by ensuring a wide spacing between the two elastic protrusions 14, the pin member 22 is engaged with only one elastic protrusion 14. For example, when the sprocket 20 rotates in the direction illustrated with the arrow θ in FIG. 2 to drive the elastic crawler 10, the pin member 22 rotates ahead of the elastic crawler 10, and thereby, as illustrated in the region A in FIG. 2, starts to enter between the two elastic protrusions 14. Next, the pin member 22 approaches the elastic protrusion 14 on the forward side in the rotation direction (the elastic protrusion 14 on the right side of the drawing among the two elastic protrusions 14 in the region A in FIG. 2) in accordance with the rotation of the sprocket 20, and simultaneously rotates together with the elastic protrusion 14. Then, as illustrated in region B in FIG. 2, in a region on the side opposite to the region A sandwiching the central axis $O_1$ of the sprocket 20, the pin member 22 is merely engaged with the elastic protrusion 14 on the forward side in the rotation direction (the elastic protrusion 14 on the left side of the drawing of region B in FIG. 2). Thereby, the pin member 22 transfers force to the elastic protrusion 14 on the forward side in the rotation direction (the elastic protrusion 14 on the right side of the drawing in FIG. 3B).

Afterward, as illustrated in region C in FIG. 2, the pin member 22 presses out the elastic protrusion 14 on the forward side in the rotation direction (the elastic protrusion 14 on the left side of the drawing in region C in FIG. 2) in the rotation direction (the left direction in the drawing in FIG. 2), and simultaneously releases the engagement with the pressure receiving surface 14a of the elastic protrusion 14. At this time, in the present embodiment, the pressure receiving surface 14a of the elastic protrusion 14 is of a shape according to the first envelope $L_1$ drawn by the outer end of the pin member 22. Thereby, as illustrated in the right side of FIG. 3B, the pin member 22 is released from the elastic protrusion 14 along the pressure receiving surface 14a. Therefore, the volume of the elastic protrusion 14 is set as large as possible, and unnecessary interference with the elastic protrusion 14 when engaged with the elastic protrusion 14 to transfer force to the elastic protrusion 14 is suppressed. Moreover, when the pin member 22 is released from the pressure receiving surface 14a of the elastic protrusion 14 such that its engagement with the elastic protrusion 14 is released, unnecessary interference with the elastic protrusion 14 is suppressed as well.

On the other hand, when running downhill, or braking such as engine braking and the like, in region B of FIG. 2, the pin member 22 is not engaged with the elastic protrusion 14. In contrary, since the elastic crawler 10 rotates ahead of the sprocket 20, as illustrated with two-dot chain line $C_2$ in FIG. 3B, the pin member 22 approaches the elastic protrusion 14 on the backward side in the rotation direction (the elastic protrusion 14 on the left side of the drawing among the two elastic protrusions 14 in FIG. 3B), and simultaneously enters between the two driving protrusions 14. At this time, in the present embodiment, the flank 14b of the elastic protrusion 14 is of a shape according to the second envelope $L_2$ drawn by the outer end of the pin member 22. Therefore, as illustrated in the left side of FIG. 3B, the pin member 22 is capable of tightly pass the flank 14b, and thus it is possible to set the volume of the elastic protrusion 14 as large as possible, and to simultaneously avoid hanging of the pin member 22 to the tip part of the elastic protrusion 14.

As mentioned above, according to the elastic crawler 10 according to the present embodiment, the outline shape in side view of the pressure receiving surface 14a is formed by the first envelope $L_1$ drawn by the outer end of the pin members 22 when the sprocket 20 rolls coaxially with the central axis of the virtual rotor 20a with the rolling diameter $D_1$ as defined in the aforementioned Formula (1), together with the virtual rotor 20a on the plane F. Thereby, the outline shape of the pressure receiving surface 14a is of a shape close to the track of the pin member 22 from being engaged with the pin member 22 until being pressed out by the pin member 22. Therefore, it is possible to suppress the interference of the pin member 22 and the elastic protrusion 14 and simultaneously increase the volume of the elastic protrusion 14, and to thereby suppress the interference of the pin member 22 and the elastic protrusion 14 and simultaneously improve the durability of the elastic protrusion 14.

In particular, by satisfying the condition 0.94≤a≤0.98 in Formula (1) similarly as the elastic crawler 10 according to the present embodiment, it is possible to suppress the interference of the pin member 22 and the elastic protrusion 14 more securely.

In the elastic crawler 10 according to the present embodiment, the elastic protrusion 14 has a flank 14b for avoiding the interference with the pin member 22, and the outline shape in side view of the flank 14b is formed by the second envelope $L_2$ drawn by the outer end of the pin members 22 when the sprocket 20 rolls coaxially with the central axis of the virtual rotor 20b with the rolling diameter $D_2$ as defined in the aforementioned Formula (2), together with the virtual rotor 20b on the plane F. In this case, the outline shape of the flank 14b is of a shape close to the track of the pin member 22 until the pin member 22 starts enter between the two elastic protrusions 14. Therefore, it is possible to suppress hanging of the pin member 22 and the elastic protrusion 14 and simultaneously increase the volume of the elastic protrusion 14, and to thereby suppress the interference of the pin member 22 and the elastic protrusion 14 and simultaneously further improve the durability of the elastic protrusion 14.

In particular, by satisfying the condition 1.00≤b≤1.03 in Formula (2) similarly as the elastic crawler 10 according to the present embodiment, it is possible to suppress the interference of the pin member 22 and the elastic protrusion 14 when breaking or running downhill, and simultaneously ensure a large volume of the elastic protrusion 14.

In the elastic crawler 10 according to the present embodiment, the outline shape in side view of the connecting part P between the pressure receiving surface 14a and the flank 14b is formed by a curve. In this case, connected smoothly with the connecting part P between the pressure receiving surface 14a and the flank 14b, it is possible to smoothly perform the engaging action and the releasing action of the pin member 22 and the elastic protrusion 14.

In the elastic crawler 10 according to the present embodiment, the connecting part P between the pressure receiving surface 14a and the flank 14b has a height h from the inner circumferential surface 11b of the endless belt 11 of 25% or more and 60% or less of the entire height H of the elastic protrusion 14. In this case, it is possible to suppress the interference of the pin member 22 and the elastic protrusion 14, and to simultaneously further improve the durability of the elastic protrusion 14.

The elastic crawler drive mechanism 100 according to the present embodiment has the aforementioned elastic crawler 10 and a sprocket 10 with a plurality of pin members 22 arranged at a spacing in a circumferential direction. According to the elastic crawler drive mechanism 100 according to the present embodiment, at least the outline shape of the pressure receiving surface 14a becomes close to a desirable shape of the track of the pin member 22 from being engaged with the pin member 22 until being pressed out by the pin member 22. Therefore, it is possible to suppress the interference of the pin member 22 and the elastic protrusion 14 and to simultaneously increase the volume of the elastic protrusion 14, and to thereby suppress the interference of the pin member 22 and the elastic protrusion 14 and to simultaneously improve the durability of the elastic protrusion 14.

As mentioned above, according to the present embodiment, it is possible to provide an elastic crawler 10 and an elastic crawler drive mechanism 100 capable of suppressing the interference of the pin member 22 and the elastic protrusion 14, and simultaneously improve the durability of the elastic protrusion 14.

Figure 7:
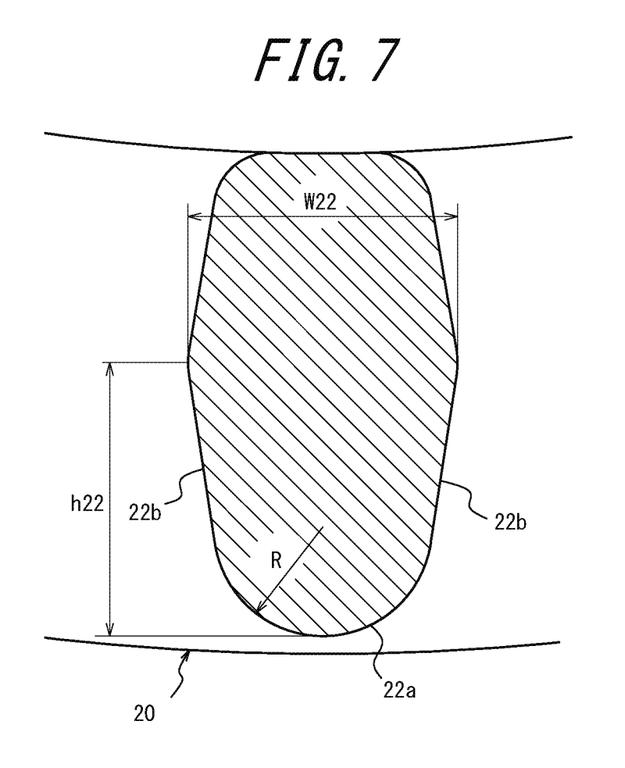
FIG. 7 illustrates a cross-sectional view in side view of the cross-sectional shape of another embodiment of the pin member used in the elastic crawler drive mechanism of this disclosure.
Figure 8:
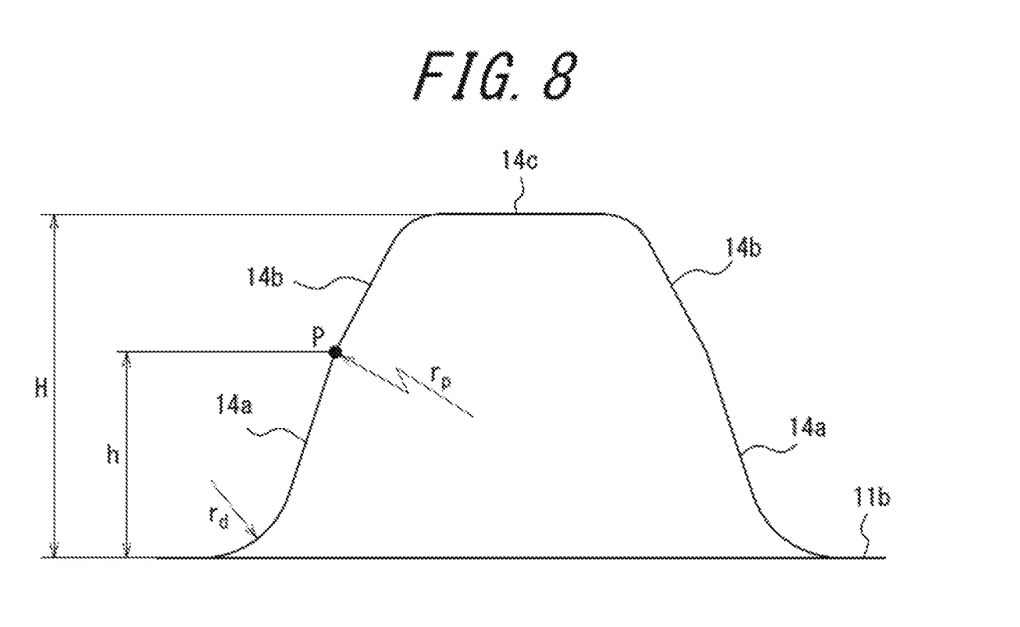
FIG. 8 illustrates a cross-sectional view in side view of the cross-sectional shape of another embodiment of the elastic protrusion used in the elastic crawler drive mechanism and the elastic crawler of this disclosure.

The description set forth above is one mere embodiment of the disclosure herein and may be changed in a variety of manners within the scope of the claims. For example, as illustrated in FIG. 3B, etc., the pin member 22 is not limited to one with a perfect circular cross-sectional shape, but is also inclusive of, e.g., one with a tapered cross-sectional shape, having a tip 22a, at which the engagement starts, formed at the radius of curvature R22, in the side view as illustrated in FIG. 7. Specifically, the pin member 22 in FIG. 7 has a maximum width w22, and both ends of this maximum width w22 are respectively connected to the tip 22a at a position of a length h22 via the plane 22b. In the side view as illustrated in FIG. 8, the driving protrusion 14 fitting with this pin member 22 has a trapezoidal cross section shape, with the apex 14c of the elastic protrusion 14 formed into a flat surface.

In the case where the rotation direction of the sprocket 20 is merely one direction, the cross-sectional shape, etc. of the elastic protrusion 14 according to this disclosure may be set such that $L_2$ is on the forward side in the rotation direction, and $L_1$ is on the backward side on the rotation direction. Moreover, the present embodiment has the steel cord layer 12 embedded in the endless belt 11 of the elastic crawler 10, but the main cord layer 12 may be omitted as well. Moreover, various configuration and arrangement applied in each embodiment may be respectively used in combination or replacement.

INDUSTRIAL APPLICABILITY

This disclosure may be applied to an elastic crawler having on an inner circumferential side a plurality of engaging portions respectively engageable with a plurality of pin members arranged at a spacing in a circumferential direction of a sprocket, and an elastic crawler drive mechanism having the elastic crawler and a sprocket having a plurality of pin members arranged at a spacing in a circumferential direction.

The invention claimed is:
1. An elastic crawler comprising on an inner circumferential side a plurality of engaging portions respectively engageable with a plurality of pin members arranged at a spacing in a circumferential direction of a sprocket, wherein:
the engaging portions have on a base side a pressure receiving surface which receives the pin members, an outline shape in side view of the pressure receiving surface being formed by an envelope drawn by an outer end of the pin members when the sprocket rolls coaxially with a central axis of a virtual rotor with a rolling diameter $D_1$ as defined in the following Formula (1), together with the virtual rotor on a plane:

$$D_1 = D_0 \times a \quad (1)$$

where $D_0$=(pitch of the engaging portions)×(number of pin members)/($\pi$), and $$0.9 \leq a < 1.$$

2. The elastic crawler according to claim 1, wherein:
a condition that $0.94 \leq a \leq 0.98$ is satisfied in Formula (1).
3. The elastic crawler according to claim 1, wherein:
the engaging portions have on a tip side a flank for avoiding interference with the pin members, an outline shape in side view of the flank being formed by an envelope drawn by an outer end of the pin members when the sprocket rolls coaxially with a central axis of a virtual rotor with a rolling diameter $D_2$ as defined in the following Formula (2), together with the virtual rotor on a plane:

$$D_2 = D_0 \times b \quad (2)$$

where $1 \leq b \leq 1.1$.
4. The elastic crawler according to claim 3, wherein:
a condition that $1.00 \leq b \leq 1.03$ is satisfied in Formula (2).
5. The elastic crawler according to claim 3, wherein:
an outline shape in side view of a connecting part between the pressure receiving surface and the flank is formed by a curve.
6. The elastic crawler according to-claim 3, wherein:
a height of the connecting part between the pressure receiving surface and the flank from an inner circumferential surface of an endless belt is 25% or more and 60% or less of an entire height of the engaging portions.
7. An elastic crawler drive mechanism comprising: the elastic crawlers according to claim 1; and a sprocket having a plurality of pin members arranged at a spacing in a circumferential direction.
8. The elastic crawler according to claim 2, wherein:
the engaging portions have on a tip side a flank for avoiding interference with the pin members, an outline shape in side view of the flank being formed by an envelope drawn by an outer end of the pin members when the sprocket rolls coaxially with a central axis of a virtual rotor with a rolling diameter $D_2$ as defined in the following Formula (2), together with the virtual rotor on a plane:

$$D_2 = D_0 \times b \quad (2)$$

where $1 \leq b \leq 1.1$.
9. The elastic crawler according to claim 8, wherein:
a condition that $1.00 \leq b \leq 1.03$ is satisfied in Formula (2).
10. The elastic crawler according to claim 4, wherein:
an outline shape in side view of a connecting part between the pressure receiving surface and the flank is formed by a curve.
11. The elastic crawler according to claim 8, wherein:
an outline shape in side view of a connecting part between the pressure receiving surface and the flank is formed by a curve.

12. The elastic crawler according to claim 9, wherein:

an outline shape in side view of a connecting part between the pressure receiving surface and the flank is formed by a curve.

13. The elastic crawler according to claim 4, wherein:

a height of the connecting part between the pressure receiving surface and the flank from an inner circumferential surface of an endless belt is 25% or more and 60% or less of an entire height of the engaging portions.

14. The elastic crawler according to claim 5, wherein:

a height of the connecting part between the pressure receiving surface and the flank from an inner circumferential surface of an endless belt-is 25% or more and 60% or less of an entire height of the engaging portions.

15. The elastic crawler according to claim 8, wherein:

a height of the connecting part between the pressure receiving surface and the flank from an inner circumferential surface of an endless belt-is 25% or more and 60% or less of an entire height of the engaging portions.

16. The elastic crawler according to claim 9, wherein:

a height of the connecting part between the pressure receiving surface and the flank from an inner circumferential surface of an endless belt is 25% or more and 60% or less of an entire height of the engaging portions.

17. An elastic crawler drive mechanism comprising: the elastic crawlers according to claim 2; and a sprocket having a plurality of pin members arranged at a spacing in a circumferential direction.

18. An elastic crawler drive mechanism comprising: the elastic crawlers according to claim 3; and a sprocket having a plurality of pin members arranged at a spacing in a circumferential direction.

19. An elastic crawler drive mechanism comprising: the elastic crawlers according to claim 4; and a sprocket having a plurality of pin members arranged at a spacing in a circumferential direction.

20. An elastic crawler drive mechanism comprising: the elastic crawlers according to claim 8; and a sprocket having a plurality of pin members arranged at a spacing in a circumferential direction.

* * * * *